(12) United States Patent
Seigel et al.

(10) Patent No.: US 6,255,825 B1
(45) Date of Patent: Jul. 3, 2001

(54) METHOD AND APPARATUS FOR DETECTING, LOCATING AND RESOLVING BURIED PIPELINES, CASED WELLS AND OTHER FERROUS OBJECTS

(75) Inventors: Harold O. Seigel, Toronto; Terrence McConnell, Aurora; Alastair Ryder-Turner, Etobicoke, all of (CA)

(73) Assignee: Scintrex Limited, Concord (CA)

( * ) Notice: Subject to any disclaimer, the term of this patent is extended or adjusted under 35 U.S.C. 154(b) by 0 days.

(21) Appl. No.: 09/283,216

(22) Filed: Apr. 1, 1999

(30) Foreign Application Priority Data

Apr. 3, 1998 (CA) ................................. 2234202

(51) Int. Cl.[7] .................. G01V 3/16; G01V 3/165; G01V 3/40; G01R 33/002
(52) U.S. Cl. ....................... 324/331; 324/326; 324/345
(58) Field of Search .................. 324/247, 326, 324/330, 331, 345

(56) References Cited

U.S. PATENT DOCUMENTS

| | | | |
|---|---|---|---|
| 2,635,134 | * | 4/1953 | Jenny ................................. 324/331 |
| 3,023,359 | * | 2/1962 | Jenny et al. ....................... 324/331 |
| 3,263,161 | * | 7/1966 | Ruddock et al. .................. 324/331 |
| 3,604,660 | * | 9/1971 | Marley ............................ 324/331 X |
| 3,663,953 | * | 5/1972 | Salvi ................................ 324/331 X |
| 3,808,519 | * | 4/1974 | Lemercier et al. ............. 324/331 X |
| 4,309,659 | * | 1/1982 | Yoshii ............................. 324/331 X |
| 5,661,649 | * | 8/1997 | Carson et al. ................. 324/331 X |

* cited by examiner

Primary Examiner—Gerard R. Strecker
(74) Attorney, Agent, or Firm—Sim & McBurney

(57) ABSTRACT

A method and apparatus are provided for surveying a given region for the presence of ferromagnetic items and other sources of magnetic field disturbance on or under the ground, such as pipelines and wellheads, etc. An array of magnetic field sensors, mounted on a suitable framework, is passed over the region while the sensors emit appropriate signals, whereupon the signals are used to determine the total magnetic field and its gradients, with respect to distance, a) in the direction of movement, b) horizontally transverse to the direction of movement, and c) in the vertical direction. The total field and its gradients are interpreted to show the presence or absence of sources of magnetic field disturbance items, as well as to discriminate between various categories of such sources.

5 Claims, 4 Drawing Sheets

Figure 1A:
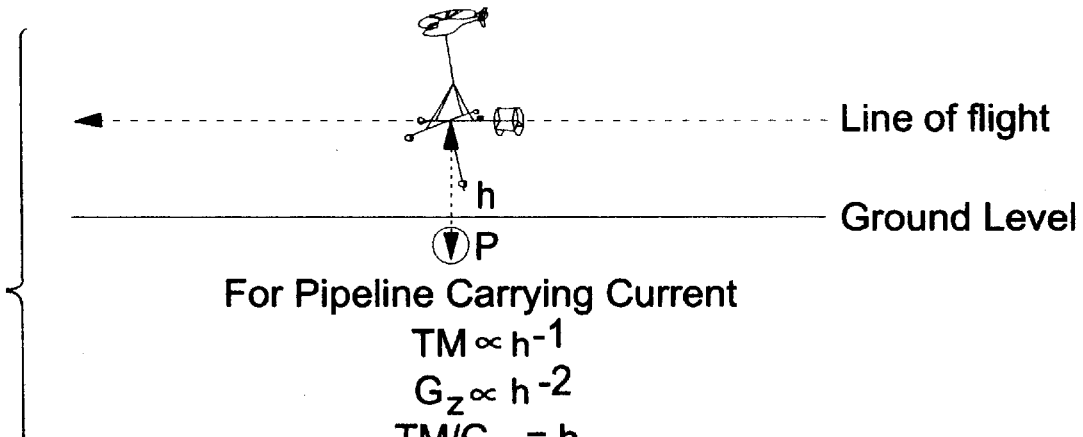

METHOD AND APPARATUS FOR DETECTING, LOCATING AND RESOLVING BURIED PIPELINES, CASED WELLS AND OTHER FERROUS OBJECTS

This invention relates generally to techniques for locating pipelines and ferromagnetic objects located at or just under the surface of the ground, and has to do particularly with a method and apparatus for detecting, locating, and resolving such objects.

BACKGROUND OF THIS INVENTION

It is essential for human activity that pipelines be laid, in order to transport gases, (usually natural gas), liquids (water, crude or refined hydrocarbons) and even slurries (e.g. coal, etc., in a liquid carrier). Commonly, these pipelines are buried, for protection against surface traffic, etc. After some years, surface vegetation or weathering may effectively mask the location of the pipelines. In some instances, there may be no information about the precise path of a pipeline, either due to the fact that its path was never accurately surveyed, or that the documentation about its path has since been lost. This may be true even if the pipeline is still being actively used for its original purpose.

In the event of further activity in the vicinity, which may necessitate the disturbance of the surface, it becomes a vital matter to precisely determine the location of the pipelines in the area, in order to avoid the possibility of inadvertent rupture of a pipeline. The consequences, in terms of personal injury or financial loss, of the rupture of a gas or oil pipeline, for example, could be very serious.

A common occurrence, for example, is the need to conduct further seismic tests, utilizing new technology, in the vicinity of a producing oil field. Seismic tests require the detonation of explosive charges, or the use of heavy vibrators, whose sites must be well clear of existing pipelines.

It may also occur, in the case of an oilfield or network of water wells where a series of wells feeds a system of collection by pipes, that the precise location of the individual wells is no longer known but must be determined, to facilitate further activity in the field.

Although means are known for locating buried pipes by ground measurements, such means usually rely on the ability to contact the pipe at one known point and, in any case, are slow and labour intensive if a large area, encompassing multiple pipelines, is to be mapped.

Pipelines are commonly made of steel, as an inexpensive, strong and durable material. Where the metal of the pipe comes into direct contact with groundwater, however, corrosion may occur, due to electrochemical action. To help guard against such corrosion, pipelines are usually covered with an impervious coating before burial. In addition, the electrical potential of the pipe is often lowered relative to the ground by use of a suitable DC generator, thus providing "cathodic protection" against corrosion, but causing DC current to flow along the pipe.

Wellheads are usually characterized by having rather long lengths of near-vertical steel casing, in order to maintain the integrity of the well and to allow gases or fluids to be brought to the surface.

Other ferrous objects, such as buried drums, submerged vessels, buried ordnance, etc. may themselves be the targets of interest for detection and precise positioning. These are usually much more limited, dimensionally, than pipelines or wellhead castings.

GENERAL DESCRIPTION OF THIS INVENTION

In view of the foregoing, it is an aim of one aspect of this invention to provide a method and apparatus whereby to precisely map the location of pipelines and wellheads, very quickly and inexpensively, from the air. It is the aim of a further aspect of this invention to provide a diagnostic means whereby the response from the pipelines and wellheads may be distinguished from one another and from responses due to geological features and other cultural sources.

It is well known that steel objects can cause changes (anomalies) in the Earth's natural magnetic field in their vicinity. These changes have often been observed in accurate surveys of the Earth's total magnetic field, whose primary objective is geologic information, and are usually regarded as "noise" on the surveys. Such magnetic "noise" may be generated by pipelines, buildings, bridges, and wellheads, etc., all of which contain significant amounts of steel.

There are really three sources of such magnetic noise, namely:

1) induced magnetization of the steel objects, in the Earth's field, due to their high magnetic susceptibility;
2) remanent (permanent) magnetization, created in the steel when it was initially formed at high temperatures, and then cooled; and
3) the magnetic field of the cathodic protection current flowing in the pipelines. Even in the case of pipelines which are not under active cathodic protection, there may be currents flowing, due to electrochemical cells set up between dissimilar ground contact points on the pipe.

In the present invention use is made of these "noises" in the Earth's magnetic field to detect and precisely locate their sources, and to resolve these sources into useful categories, such as pipelines, wellheads and local steel objects (buildings, bridges, ordnance. etc.).

More particularly, this invention provides an apparatus for mapping the ground location of pipelines and wellheads from the air, comprising:

a framework adapted to be transported above the ground, the framework having a prescribed orientation relative to the transport direction, first and second magnetic field sensors supported on the framework so as to be in substantially the same horizontal plane and spaced apart transverse to the direction of transport when the framework is being transported in said prescribed orientation, a third magnetic field sensor supported by said framework, altimeter means for determining the elevation of the sensors above the ground, and computing means for receiving signals from all of the sensors and the altimeter, and for determining field gradients by operations based on the received signals.

Further, this invention provides a method of mapping the ground location of pipelines and wellheads from the air, utilizing a framework on which are supported:

first and second magnetic field sensors positioned so as to be spaced apart transversely in the same horizontal plane when the framework is in a prescribed orientation relative to the direction of transport and to the vertical, a third magnetic field sensor located so as to be substantially vertically aligned with the mid-point between the first and second sensors when the framework is in said prescribed orientation, and altimeter means supported on said framework for determining the elevation of the sensors above the ground, the said method including the steps:

A. transporting the framework spaced above the ground such that the framework maintains said prescribed orientation relative to the direction of transport and to the vertical, B. during transport, causing said sensors and said altimeter means to emit signals, C. utilizing the said signals to determine a) the total field variations and b) the magnetic field gradients in three mutually perpendicular directions, and D. interpreting said variations and gradients to determine the presence of pipelines and wellheads on or under the ground.

In addition, this invention provides a method of mapping the ground location of pipelines and wellheads from the air, utilizing a framework on which are supported:

first and second magnetic field sensors positioned so as to be spaced apart transversely in the same horizontal plane when the framework is in a prescribed orientation relative to a direction of transport and to the vertical, a third magnetic field sensor supported by said frame in a location where it is substantially equidistant from said first and second sensors, and is located substantially vertically under the mid-point between the first and second sensors when the framework is in said prescribed orientation, a fourth magnetic field sensor located in the same horizontal plane as the first and second sensors and equidistant therefrom, but spaced away from the mid-point between the first and second sensors in the direction of flight, and altimeter means supported on said framework to determine the elevation of the sensors above the ground, the said method including the steps:

A. transporting the framework spaced above the ground such that the framework maintains said prescribed orientation relative to the direction of transport and to the vertical, and B. utilizing signals received from all of the sensors and said altimeter means to determine a) total field variations on the basis of the signal from said third sensor, b) the vertical gradient on the basis of the mean of the signals from the first and second sensors, together with the signal from the third sensor, c) the horizontal gradient along the flight direction on the basis of the mean of the signals from the first and second sensors, together with the signal from the fourth sensor, and d) the transverse gradient on the basis of the difference between the first and second sensors.

C. interpreting the determinations made under B in terms of the presence or absence of pipelines and wellheads.

Finally, this invention provides a method of surveying a given region for the presence of ferromagnetic items on or under the ground, comprising passing an array of magnetic field sensors over the region while causing the sensors to emit signals, using the signals to determine the magnetic field gradients, with respect to distance, a) in the direction of movement, b) horizontally transverse to the direction of movement, and c) in the vertical direction, and interpreting such gradients as showing the presence or absence of the said ferromagnetic items.

GENERAL DESCRIPTION OF THE DRAWINGS

Figure 1B:
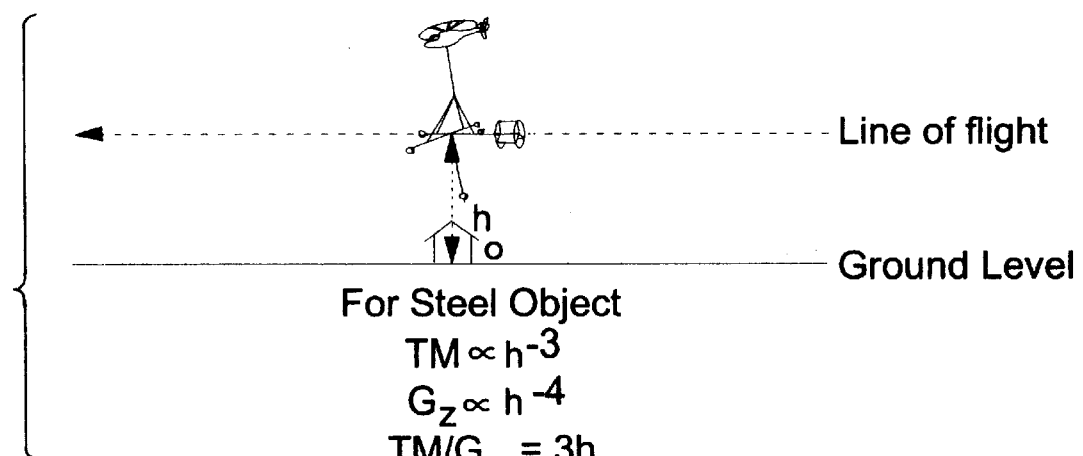
Figure 1C:
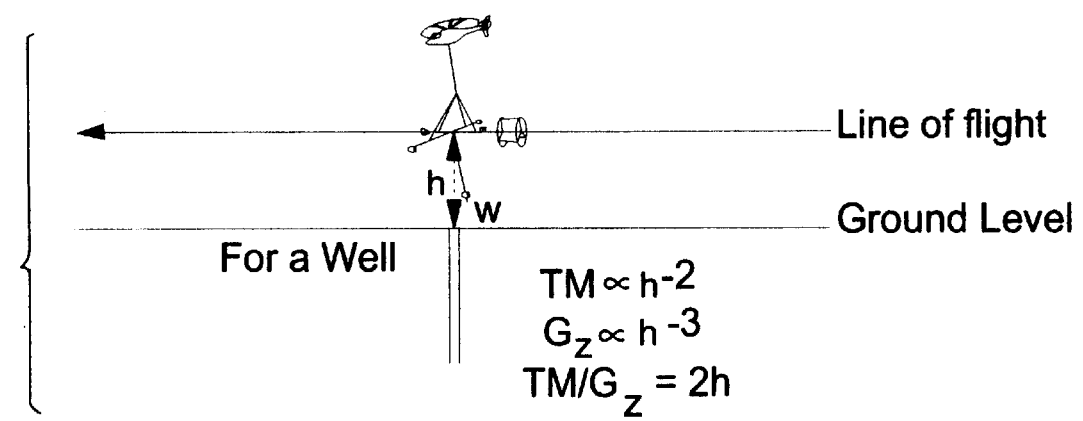
Figure 2A:
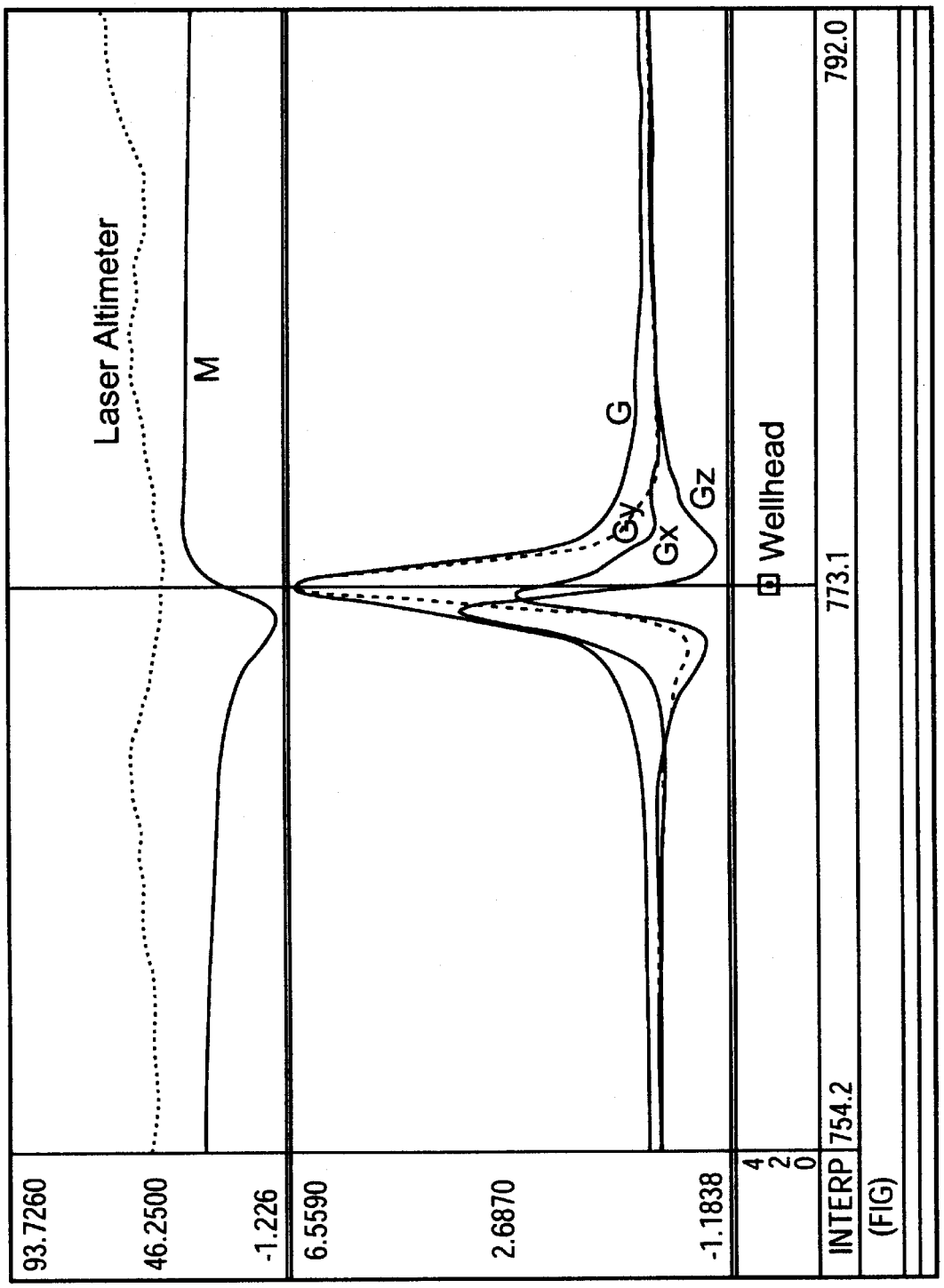
Figure 2B:
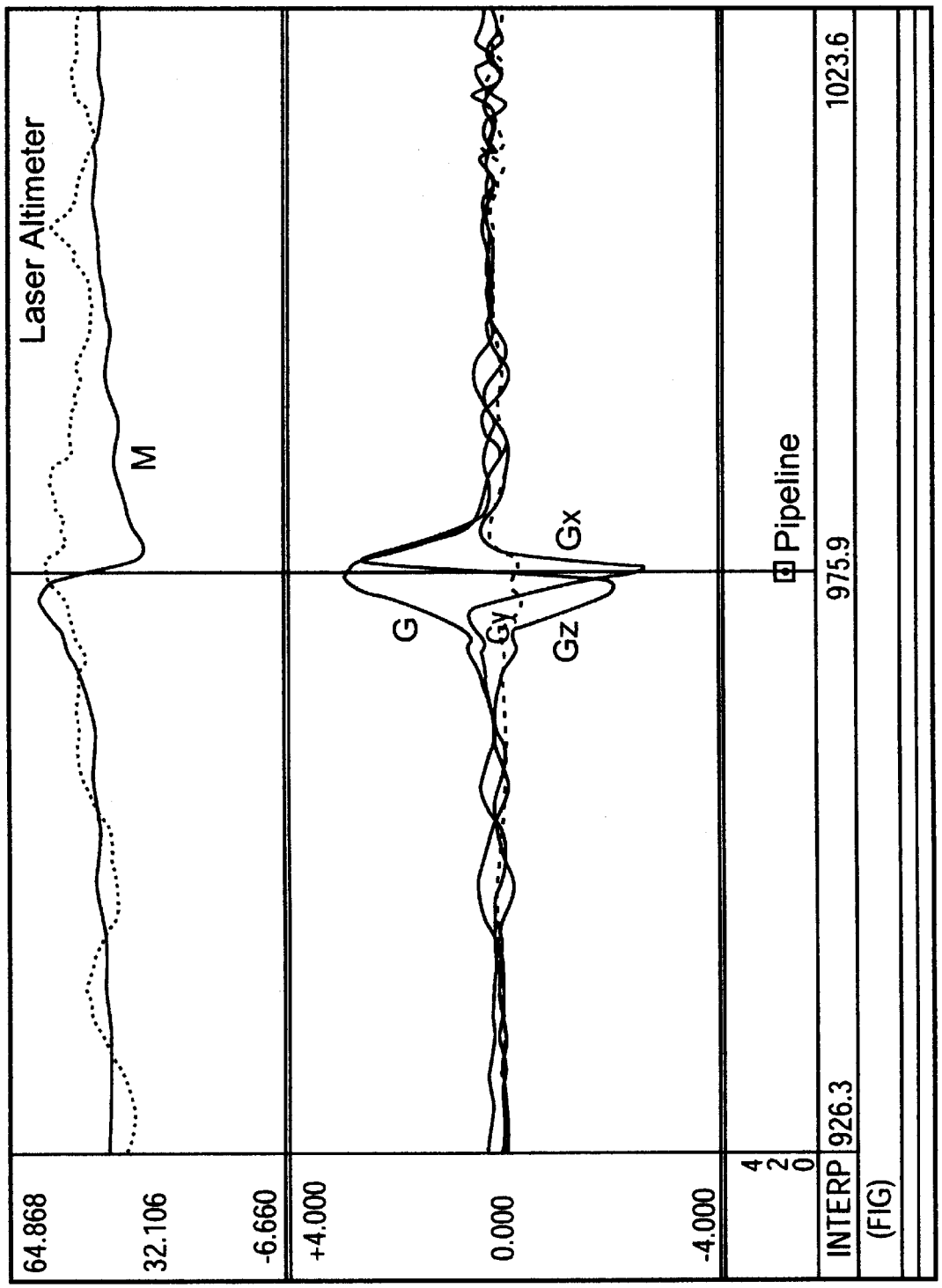
Figure 3:
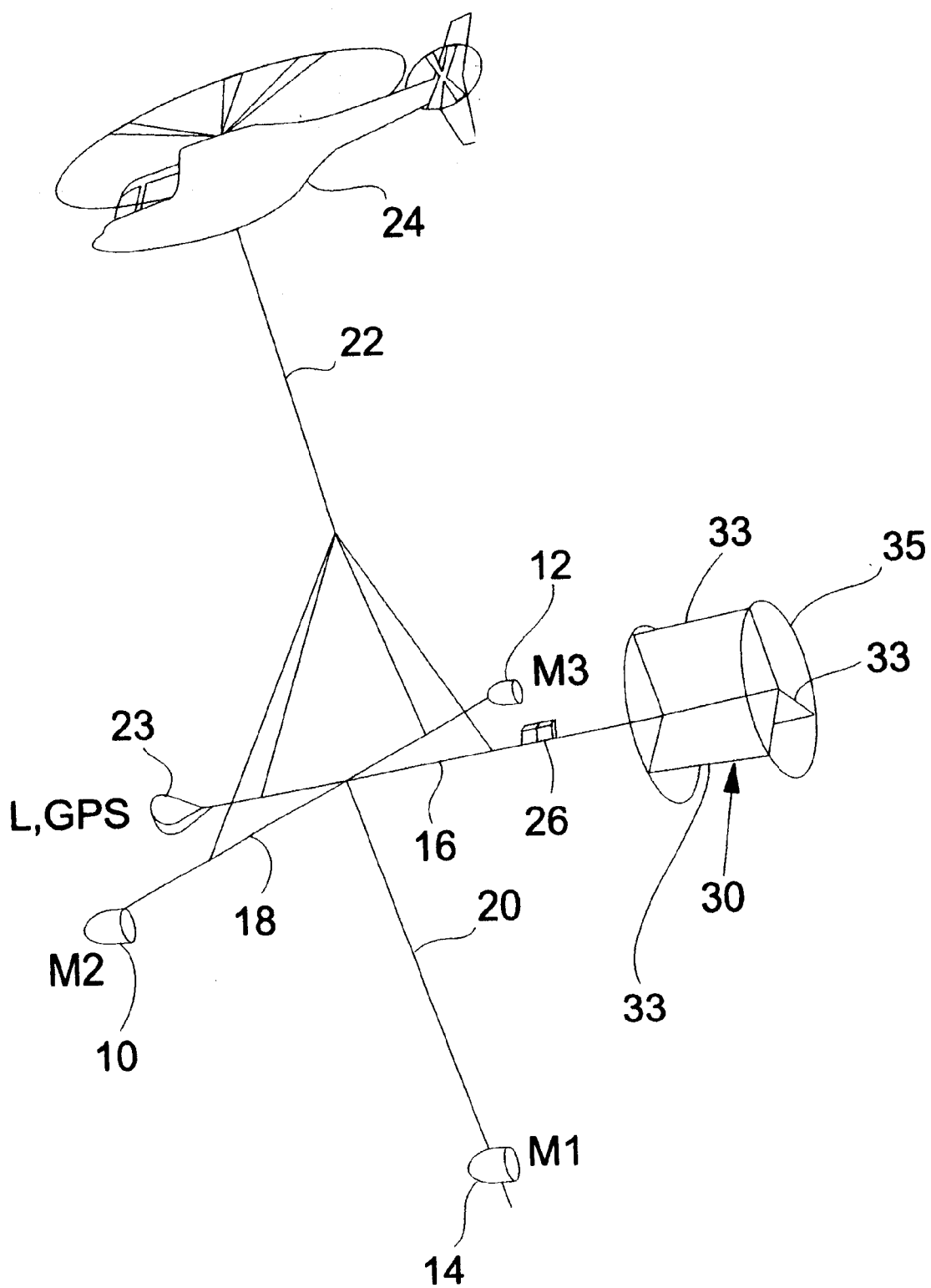

One embodiment of this invention is illustrated in the accompanying drawings, in which like numerals denote like parts throughout the several views, and in which:

FIGS. 1(a), 1(b) and 1(c) are schematic elevational views showing a helicopter-supported apparatus in relation to the ground level and three different kinds of ferromagnetic objects to be detected;

FIGS. 2(a) and 2(b) are graphical representations of the magnetic anomalies caused by a wellhead and a pipeline, respectively, as detected by the apparatus of this invention; and FIG. 3 is a perspective view of an apparatus designed for carrying out this invention, the apparatus being supported by a helicopter.

DETAILED DESCRIPTION OF THIS INVENTION

In practice it is no easy matter to classify cultural magnetic anomalies into the three important categories listed above, or even to precisely determine their location. Neither the amplitude nor curve form of the various anomalous responses on the Earth's total magnetic field can be relied upon for these purposes, since the effects of remanence magnetization, susceptibility and body shape, etc. are unknown. In addition, such responses rarely conform to those ideally predicted by theory, particularly where there are two sources in close proximity.

However, if these three main types of cultural magnetic source, namely pipelines, steel structures, (building, bridges, etc.) and wellheads, are examined by means of a helicopter-supported or aircraft-supported apparatus such as that shown in FIG. 1, their individual responses can be characterized geometrically, as follows:

1. Pipelines

It may be assumed that pipelines are most likely to be detectable by virtue of the DC currents, usually cathodic protection or natural electrochemical currents, flowing in them. As FIG. 1(a) shows, the total magnetic field anomaly created by this current, on an airborne magnetic survey conducted at a height h above the pipeline P, will have an amplitude (TM) which varies as the inverse first power of h. That is, it acts as a line source of current. The amplitude (TM) is also dependent on the orientation of the pipeline relative to the direction of the local magnetic field of the Earth.

For this same source, if the vertical magnetic gradient (Gz) of its anomaly is calculated, it will be seen that the amplitude of Gz varies inversely as $h^2$. The shape and amplitude of the Gz anomaly are also dependent on the inclination of the Earth's field in the vicinity.

In both instances above (TM, and Gz), the term "amplitude" is considered to mean the peak-to-peak anomaly of each quantity, because the resultant curve forms have typically two main peaks, one being positive and one negative.

For pipelines carrying currents the ratio of amplitudes is TM/Gz≈h.

For pipelines not carrying currents, reference should be had to item 3 of the disclosure hereinbelow, relating to wellheads.

2. Local Ferrous Objects

As FIG. 1(b) shows, the amplitude of the TM response from a steel object O, whose dimensions are all smaller than h, varies inversely as $h^3$ i.e., it acts as a dipolar source. The shape of the anomaly depends on the induction and remanence of the source. The Gz response has an amplitude which varies inversely as $h^4$.

The ratio of TM/Gz in this case≈3h.

3. Wellheads

Since wells are usually steel cased to considerable depths, they will be highly magnetized in the Earth's magnetic field.

Thus, they commonly produce a magnetic anomaly very much like a single magnetic pole at the wellhead.

As FIG. 1(c) shows, for such a source wellhead W, TM will vary inversely as $h^2$, and Gz will vary inversely as $h^3$. The ratio of TM/Gz≈2h.

Thus, if TM and Gz can be measured simultaneously in the same survey, and the ratio of TM/Gz calculated in respect of cultural anomalies so detected, the criterion is thus provided for categorizing the individual magnetic anomalies in terms of the three types of sources listed above. Of course, it is also necessary to have a reasonable estimate of h in order to apply this criterion.

Thus, to summarize, the diagnostic Source Factor S is given by

|      |                 | S = TM/hGz | (1) |
|------|-----------------|------------|-----|
| For: | Pipelines       | S ≈ 1      |     |
|      | Wellheads       | S ≈ 2      |     |
|      | Local Structures| S ≈ 3      |     |

For purposes of this calculation, TM may be in units of nanoTeslas (nT), Gz in nT per m, and h in m.

In the case of a long pipeline which carries no current, its magnetic anomaly may take the form of two (opposite polarity) magnetic poles, one at each end of the pipe. The Source Factor will then be that of wellheads at each end. The interpreter of the magnetic data must bear this ambiguity in mind in such cases.

The diagnostic source factor for a specific magnetic anomaly source will decide its selection for further study, or its rejection as being of no interest, depending on the objectives of the program. It does not, however provide its precise location.

As has been indicated above, it is not always easy to determine the exact source location from the shape of the total magnetic field anomaly curve. The curve is usually dipolar, with peaks of unequal amplitude, which are displaced from the source position by unequal amounts, depending on the value of h and the orientation of the magnetic moment of the source relative to the Earth's magnetic field.

FIG. 2 illustrates this problem, using actual field data from an aerial magnetic survey in Mexico. Two magnetic sources are considered, one being a cathodically protected pipeline (FIG. 2b), showing S≈1, and the second being a wellhead (FIG. 2a), with S≈2.

Both sources produce noticeable anomalies on the total field (M), as well as on three measured gradients of the total field, namely Gz (vertical), Gx (horizontal, in the direction of flight) and Gy (horizontal, transverse to the flight).

It may be seen that the two sources do not coincide exactly with the peaks of any of these measured curves. However, the inventors have found that by calculating the quantity which is referred to herein as the "Total Gradient" G, defined as $$G=\sqrt{Gx^2+Gy^2+Gz^2} \qquad (2)$$

a quantity is produced which is always positive, and which peaks at the exact target position.

The curve for G, as calculated, is also shown on FIG. 2, to illustrate this useful characteristic of the Total Gradient G.

Thus it has been shown that by measuring the total magnetic field and its three orthogonal spatial gradients, it is possible to
a) usefully categorize the nature of the source of ferrous anomalies, and
b) determine their precise locations, without any assumptions as to remanence etc.

FIG. 3 shows one embodiment of an apparatus that can be used with this invention. It consists of three total field magnetic sensors 10, 12 and 14 on a rigid structure consisting of three orthogonal booms 16, 18 and 20, suspended by a cable 22 beneath a helicopter 24. The boom 16 is horizontal, oriented along the direction of flight; the boom 18 is horizontal, transverse to the direction of flight; and the boom 20 is vertical. All three of the magnetic field sensors 10, 12 and 14 lie in the same vertical plane, transverse to the direction of flight. In the case of an aircraft installation two sensors may be wingtip mounted, with the third (vertical) mounted above the tail.

In FIG. 3, the lowest magnetic sensor 14 ($M_1$) is usually used to determine the total field variations. The mean of the outputs of the two transverse mounted sensors 10 and 12 ($M_2$ and $M_3$) is used, together with the lowest sensor 14, to determine the vertical gradient Gz. To determine Gx, the horizontal gradient along the flight direction, one may use the rate of change with distance along the flight line of the output of any one of the (or the mean of all three) sensors. The difference between the two transverse sensors 10 and 12 directly determines the transverse gradient (Gy).

Typically, each sensor is a high-sensitivity total field magnetometer, of the optically-pumped type, for low noise, optimum detection and resolution of weak anomalies. The separation of the transverse sensors 10 and 12 may be of the order of 3 m, and the vertical sensor 14 may be suspended about 3 m below the centre point of the transverse sensors 10 and 12.

As illustrated, forward of the central point is a pod 23 containing a laser altimeter (L), whereby the elevation of the sensors above the ground may be determined, and therefore the value of h. In addition, a GPS (Global Positioning System) receiver is located in the pod, whereby the position of the sensor array may be accurately determined at all times. Commonly, as well, sensors for roll, pitch and yaw are also mounted in the pod, for geometric correction of system attitude.

Whereas this specific embodiment of an apparatus for this invention employs an array of three sensors, a fourth sensor 26 could be employed, mounted in the same horizontal plane as the transverse sensors, but either 3 m or so in front or behind them (shown behind in FIG. 3). The addition of the fourth sensor 26 would allow the Gx measurement to be made directly, rather than by calculation from successive M measurements, resulting in some improvement in accuracy. At the rearward end of the boom 16 there is provided a tail assembly 30 which, in this embodiment, consists of three rectangular panels 33 joined at a common edge which is in axial alignment with the boom 16, on which it is mounted. Structural elements 35 serve to maintain the proper geometry of the panels 33, each of which extends at an angle of approximately 120° from the other two.

Typically, in the application of this invention, the following computation is carried out.

1. Total Gradient

If $M_1$ $M_2$ and $M_3$ are the outputs of the total field magnetometer sensors, in nT, with $M_1$ being that of the lower sensor, and if the sensors are 3 m apart horizontally and vertically, then calculate:

| Vertical Gradient | Gz = [$M_1$ − ($M_2$ + $M_3$)]/3 | nT/m | (3) |
|---|---|---|---|
|  | Gy = [$M_2$ − $M_3$]/3 | nT/m | (4) |
|  | Gx = Δ$M_1$/Δx | nT/m | (5) | where Δ$M_1$ is the change in $M_1$ when the sensor has moved a short distance Δx (e.g., 3 m) along the flight line direction.

Alternatively, one may compute $$Gx=\Delta(M_1+M_2+M_3)/3\,\Delta x \qquad (6)$$

i.e., the spatial gradient of the mean of all three sensors.

From the above, the Total Gradient can be calculated $$G=[Gx^2+Gy^2+Gz^2] \tag{2}$$

The maximum of this parameter accurately determines the position of the source of the specific magnetic anomaly.

2. Source Factor

For each specific anomaly the peak-to-peak total field anomaly amplitude (TM) and the peak-to-peak vertical gradient anomaly Gz are calculated.

The elevation ($h_1$) of the sensor array above the ground is measured at the precise position of the source (determined above), using the output of the laser altimeter. The depth of burial (d) of the pipeline beneath the surface of the ground is then estimated. Usually d is small and fairly constant for a specific pipeline. The value of h to employ in determining the Source Factor is then given by $$h=h_1+d \tag{8}$$

and $$S=TM/hGz \tag{1}$$

In exceptional circumstances, the M and Gz anomalies may be largely single peaked, so that peak-to-peak determination may not apply. In such cases, the TM and/or Gz values may be determined by estimating the difference between the value at the single peak and the local background level of the M or Gz measurements.

A person understanding the present invention, as set out in this disclosure, may contemplate modifications and variations thereof which remain within the breadth and scope contemplated by the inventors.

What is claimed is:

1. Apparatus for mapping the ground location of pipelines and wellheads from the air, comprising:

first, second and third total magnetic field sensors, a framework adapted to be transported above the ground, the framework comprising a horizontal transverse boom having opposed ends at which are mounted the first and second total magnetic field sensors, a vertical boom extending vertically from the mid-point of the horizontal boom and supporting the third total magnetic sensor at its end remote from said mid-point, and a horizontal, longitudinal boom at right-angles to the transverse and vertical booms and secured thereto, the longitudinal boom having a forward end and a rearward end, a pod at said forward end, and a tail assembly at said rearward end, the tail assembly functioning to maintain the framework in a prescribed orientation relative to the transport direction during flight, altimeter means in said pod, for determining the elevation of the sensors above the ground, and computing means for receiving signals from all of the sensors and the altimeter, and for determining magnetic field gradients in three mutually perpendicular directions, by operations based on the received signals.

2. The apparatus claimed in claim 1, in which said computing means further determines total magnetic field variations on the basis of the signal from said third sensor, and said magnetic field gradients include the vertical gradient determined on the basis of the mean of the signals from the first and second sensors, together with the signal from the third sensor, the horizontal gradient along the flight direction determined on the basis of the rate of change with distance of the output of at least one of the sensors, and the transverse gradient determined on the basis of the difference between the first and second sensors.

3. The apparatus as claimed in claim 2 in which said framework is transported by a helicopter.

4. A method of surveying a given region for the presence of ferromagnetic items on or under the ground, comprising passing an array of magnetic field sensors over the region while causing the sensors to emit signals, the array arranged such that first and second magnetic field sensors are horizontally spaced and transverse to the direction of movement and a third magnetic field sensor is vertically spaced from the midpoint of the spacing between said first and second magnetic field sensors, using the signals to determine the magnetic field gradients, with respect to distance, a) in the direction of movement, b) horizontally transverse to the direction of movement, and c) in the vertical direction, and interpreting such gradients as showing the presence or absence of the said ferromagnetic items, the step of interpreting the gradients including calculating the value of G in accordance with the formula:

$$G=\sqrt{Gx^2+Gy^2+Gz^2}$$

in which Gx is the gradient in the direction of movement,

Gy is the gradient horizontally transverse to the direction of movement, and

Gz is the gradient in the vertical direction, and determining the location of a peak value of G to pinpoint the ferromagnetic item.

5. A method of surveying a given region, while discriminating between various sources of magnetic field disturbance on or under the ground, comprising passing an array of total magnetic field sensors and an altimeter over the region, while causing the sensors to emit signals, the array arranged such that first and second magnetic field sensors are horizontally spaced and transverse to the direction of movement and a third magnetic field sensor is vertically spaced from the midpoint of the spacing between said first and second magnetic field sensors, using the said signals to determine the total magnetic field and its vertical gradient in a plane transverse to the direction of movement, and calculating the ratio of TM/Gz, where TM is the amplitude of total magnetic field disturbance and Gz is the amplitude of the total field gradient in the vertical direction, to determine the nature of said sources of magnetic field disturbance.

* * * * *